(12) United States Patent
Becker et al.

(10) Patent No.: US 7,097,252 B2
(45) Date of Patent: Aug. 29, 2006

(54) MOTOR VEHICLE SEAT WITH A SEAT BACK HINGE

(75) Inventors: Burckhard Becker, Solingen (DE); Dieter Strasser, Wielenbach (DE); Michael Hennicke, Solingen (DE)

(73) Assignee: C. Rob. Hammerstein GmbH & Co. KG, (DE)

( * ) Notice: Subject to any disclaimer, the term of this patent is extended or adjusted under 35 U.S.C. 154(b) by 430 days.

(21) Appl. No.: 10/668,505

(22) Filed: Sep. 23, 2003

(65) Prior Publication Data

US 2005/0062328 A1    Mar. 24, 2005

(30) Foreign Application Priority Data

Sep. 23, 2003  (DE)  ................ 102 44 290

(51) Int. Cl.
  *B60N 2/02*  (2006.01)
(52) U.S. Cl. ................. 297/378.12; 297/378.14; 297/378.13
(58) Field of Classification Search .......... 297/378.14, 297/378.12, 284.9, 284.4, 378.13
See application file for complete search history.

(56) References Cited

U.S. PATENT DOCUMENTS

| 3,736,026 | A | * | 5/1973 | Ziegler et al. | ......... 297/378.14 |
|---|---|---|---|---|---|
| 4,726,622 | A | * | 2/1988 | Palvolgyi | ................ 297/378.12 |
| 5,412,964 | A | * | 5/1995 | Yee | ............................... 70/261 |
| 5,460,429 | A | * | 10/1995 | Whalen | .................. 297/378.11 |
| 5,938,286 | A | * | 8/1999 | Jones et al. | ............ 297/378.12 |
| 6,464,299 | B1 | * | 10/2002 | Castagna | ................ 297/378.12 |
| 6,513,875 | B1 | * | 2/2003 | Gray et al. | ............ 297/378.14 |
| 6,736,460 | B1 | * | 5/2004 | Becker et al. | ......... 297/378.12 |

FOREIGN PATENT DOCUMENTS

DE    197 41 996 A1    3/1999

\* cited by examiner

*Primary Examiner*—Peter M. Cuomo
*Assistant Examiner*—Erika Garrett
(74) *Attorney, Agent, or Firm*—Akerman Senterfitt (57) ABSTRACT

A motor vehicle seat with a seat back hinge including a lower hinge arm associated with a seat carrier and an upper hinge arm associated with a seat back. A locking mechanism prevents the seat back tilting forward in a locked position and allows tilting of the seat back in a released position. The locking mechanism includes a handle, and a blocking lever hinged to the seat back that includes a blocking side. The upper hinge arm cooperates with the blocking side and a retaining catch stop. A retaining lever on the seat back forms a retaining lug which abuts the retaining catch stop in the tilted position of the seat back and retains the seat back in position. The blocking lever pivots upon actuation of the handle to abut the retaining lever, which is pivoted as a result, releasing the retaining lug from engagement with the retaining catch stop.

9 Claims, 6 Drawing Sheets

MOTOR VEHICLE SEAT WITH A SEAT BACK HINGE

BACKGROUND OF THE INVENTION

The invention relates to a motor vehicle seat with a seat carrier, with a seat back and with a seat back hinge that is disposed between seat carrier and seat back and is comprised of a lower hinge arm associated with said seat carrier as well as of an upper hinge arm associated with said seat back.

Motor vehicle seats are known in which the seat back can be pivoted to substantially a horizontal plane through an additional pivot hinge member provided above the pivot axis of the normal seat back hinge. The pivot hinge member, which is located higher, permits to sufficiently tilt the seat when it is adjusted in the forward direction. The forward tilted seat may be used as a table, this feature being termed the "table function". The decisive feature is that the seat back be folded down as far as possible so that the seat occupies little space and that the vehicle in which the motor vehicle seat is mounted can be advantageously loaded and can for example carry a bulky load.

A motor vehicle seat with a table function is known from DE 197 41 996 A.

In view of the motor vehicle seat of the type mentioned herein above, it is the object of the invention to indicate a motor vehicle seat with table function that is simple in construction and is built from a few component parts, is reliable in function and easy to operate.

SUMMARY OF THE INVENTION

In view of the motor vehicle seat of the type mentioned herein above, the solution to this object is achieved in that the upper hinge arm is connected to the seat back through a forward tilt axis, that a locking mechanism is provided between seat back and upper hinge arm, said locking mechanism preventing the forward tilt motion of the seat back about the forward tilt axis in the locked position and allowing said seat back to tilt forward in the released position, that the locking mechanism comprises a handle, that the locking mechanism comprises a blocking lever that is hinged to the seat back, is connected to and cooperates with the handle and is comprised of a blocking side, that the upper hinge arm has a complementary side that cooperates with the blocking side and further forms a retaining catch stop, that a retaining lever is hinged to the seat back, said retaining lever forming a retaining lug which abuts against the retaining catch stop in the forward tilted position of the seat back and retains the seat back in the forward tilted position and that the blocking lever is located in proximity to the retaining lever and is pivoted upon actuation of the handle so as to abut against the retaining lever which is pivoted as a result thereof in such a manner that the retaining lug is released from engagement with the retaining catch stop.

With this vehicle seat, an advantageous table function is achieved with relatively few component parts without having to notably change the function and more specifically the design of the seat. The motor vehicle seat of the invention behaves like a normal motor vehicle seat as long as the locking mechanism is not released. The amount of recline of the seat back may be adjusted by means of the seat back hinge just like that of a normal motor vehicle seat. This adjustment may for example be performed by an associated handwheel or by motor-driven adjustment.

As compared to a normal motor vehicle seat, the motor vehicle seat in accordance with the invention additionally has a forward tilt axis about which the seat back may be tilted forward into the table function position. Normally, such a movement about the forward tilt axis is not possible. The locking mechanism is provided for this purpose. A forward tilt motion is only possible upon actuation of a handle by means of which the locking mechanism is released so that the seat back is allowed to be tilted forward about the forward tilt axis.

This forward tilting motion about the forward tilt axis may be relatively quick, and in any case quicker than the usual adjustment of the seat back hinge according to the state of the art. Accordingly, the vehicle seat in accordance with the invention is also suited for quickly tilting the seat back forward, thus for example facilitating access to the region behind the motor vehicle seat.

The locking mechanism merely has a blocking lever and a retaining lever. Both are hinged to the seat back and are hinge-linked to a carrier of the seat back. Usually, they are provided once on either side of the seat. However, it is also possible to provide but one seat side with a retaining lever. Another possibility is to have the two levers mounted to one seat side only.

The blocking lever is connected to and cooperates with the handle, meaning the handle may cause the blocking lever to pivot. For this purpose, it is for example connected to the handle through a cable, the handle is preferably disposed laterally in the top region of the seat back and may be configured as a flap, a grip or the like. The blocking lever has a blocking side, which cooperates with a complementary side formed on the upper hinge arm. In the locked position, the blocking side of said blocking lever abuts against the complementary side. As a result, the seat back is not allowed to tilt forward about the forward tilt axis. The forward tilt axis is located beneath the blocking lever, it is provided between the upper hinge arm and the seat back.

The blocking lever further has a blocking back which, in the blocked position, abuts against a blocking curve of the upper hinge arm. Through this abutment, backward pivot movement of the seat back is blocked. The blocking lever is pivotable about a blocking lever axis located in immediate proximity to the blocking back. Preferably, it is centered on the blocking lever axis over at least a portion thereof.

For locking the seat back in its normal position, the retaining lever is not needed. The retaining lever is disposed in immediate proximity to, preferably slightly above, the blocking lever. It is hinged to the seat back so as to be pivotable about a retaining lever axis. It is preferably elongated and abuts, in the normal position, on an outer curve of the upper hinge arm. It is roughly tangential thereto. Its function is to retain the seat back in the forward tilted position. It is provided for this purpose with a retaining lug that, in the forward tilted position of the seat back, abuts against a retaining catch stop formed on the upper hinge arm.

As the seat back is pivoted forward, the retaining lever is caused to ride along the outer curve until it is allowed to engage the retaining catch stop. Once this has happened, the seat back is locked in the forward tilted position. It may be pivoted upward from this position if the retaining lever is pivoted about its retaining lever axis in such a manner that the retaining lug is released from the retaining catch stop. This is achieved by pivoting the blocking lever by means of the handle. As a result of the close proximity between the two levers, pivoting the blocking lever will cause the retaining lever to pivot as well. It is thus released, so that the seat back may be tilted back. As the seat back is being tilted back, the blocking back is again caused to move against the blocking curve and the blocking lever is pivoted so far that its blocking side pivots toward the complementary side against which it comes to rest. The angle between the blocking side and the complementary side is relatively small, it preferably lies within the range of self-locking. In general, a clearance free blocking is thus achieved. In the normal position, the retaining lever substantially extends along the outer curve, outside thereof.

As a result of the relatively few component parts used, a clearance free blocking is achieved in the normal position, meaning in the normal utilization position of the seat back, on the one hand while the seat back is fixed in the forward tilted position on the other hand. A motor vehicle seat which is simple in construction and exhibits good utilization properties is obtained in this way. The invention permits to retrofit normal motor vehicle seats with this additional function.

BRIEF DESCRIPTION OF THE DRAWINGS

Further advantages and characteristics of the invention will become apparent after reviewing the subordinate claims and the following non restrictive description of an embodiment thereof, given by way of example only with reference to the drawings, wherein:

DETAILED DESCRIPTION OF THE INVENTION

The motor vehicle seat has a seat carrier 20 that is hinge-linked to a lengthwise adjustment device 26 through the respective two front parallel arms 22 and two rear parallel arms 24 of a parallelogram, said length adjustment device being adapted to be in turn secured to an underbody of a motor vehicle (not shown).

The seat carrier is provided with a padding 28. A lower hinge arm 30 of a seat back hinge 32 is secured to the seat carrier. This applies to both seat sides. The seat back hinge 32 has an upper hinge arm 34 that is configured to be substantially hook-shaped, similar to the shape of a number 2. The seat back hinge 32 can be pivoted about a hinge axis 36. A corresponding adjustment device is not shown herein, it may be a prior art adjustment device such as a wobble plate.

As can be surveyed from the Figs., the upper hinge arm 34 is composed of two portions. An additional upper component part extends upward as a continuation of the normal prior art seat back hinge 32, said upper component part substantially forming the hook-shaped curve. The upper component part is connected on two fixation points to the normal upper hinge arm of a standard seat back hinge. As a result, the seat back hinge 32 can be made using mass produced component parts.

Figure 4:
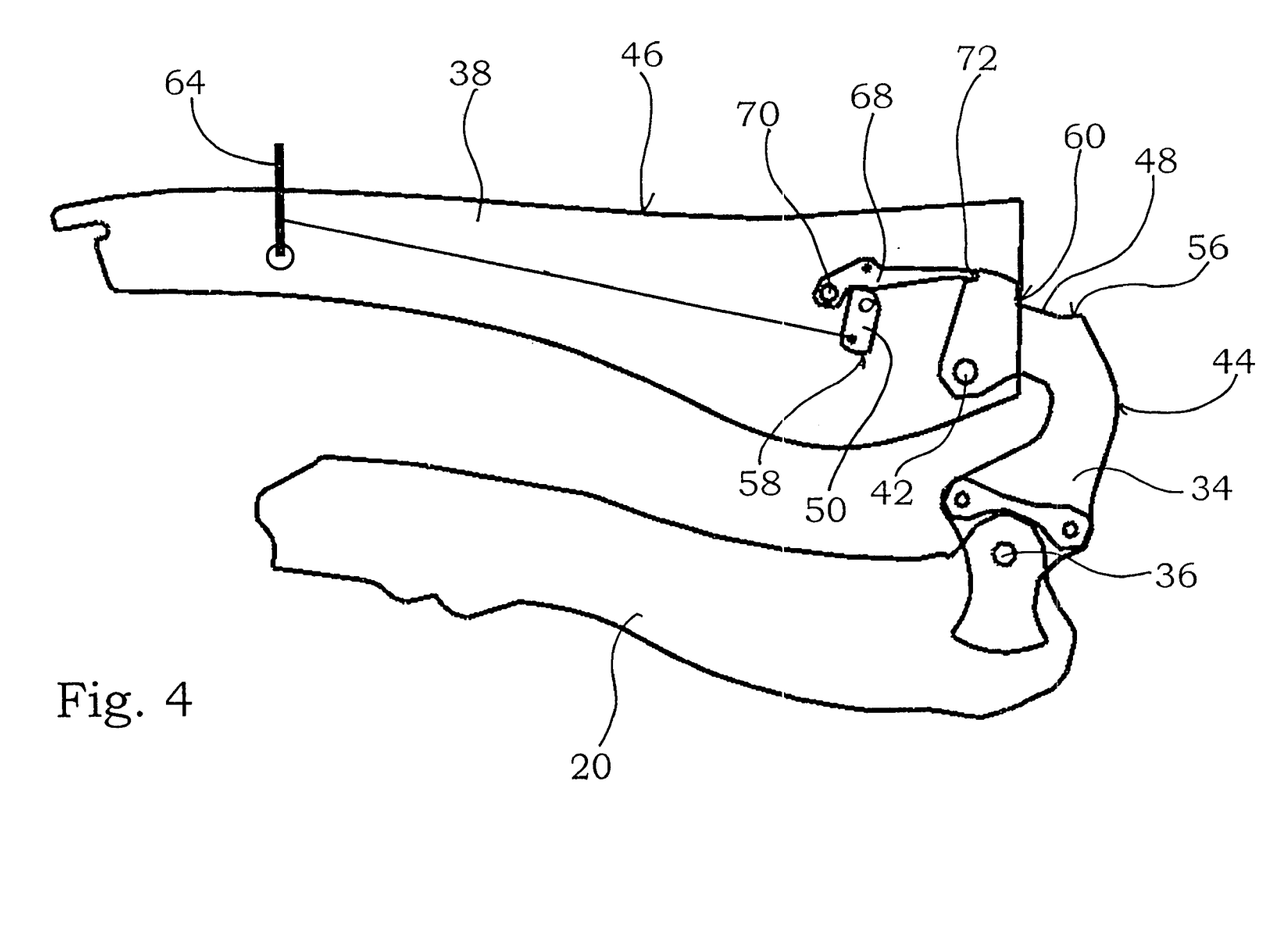
FIG. 4 is a side view of the motor vehicle seat similar to FIG. 3, with the seat back now being in a completely forward tilted and locked position.
Figure 5:
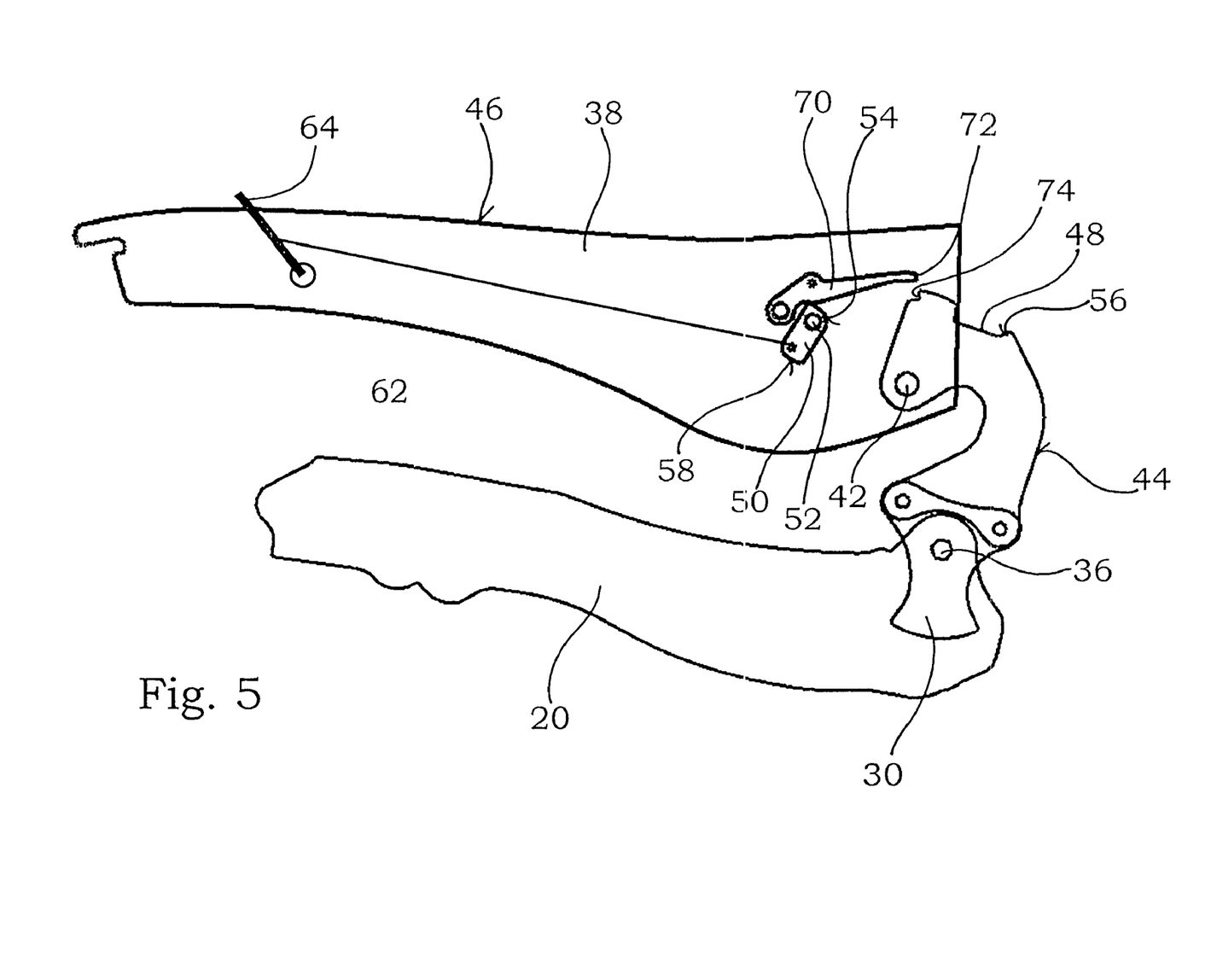
FIG. 5 is a side view of the motor vehicle seat similar to FIG. 4, with the retaining lever now being pivoted upward as a result of the action of the blocking lever so that the locked position may be released
Figure 6:
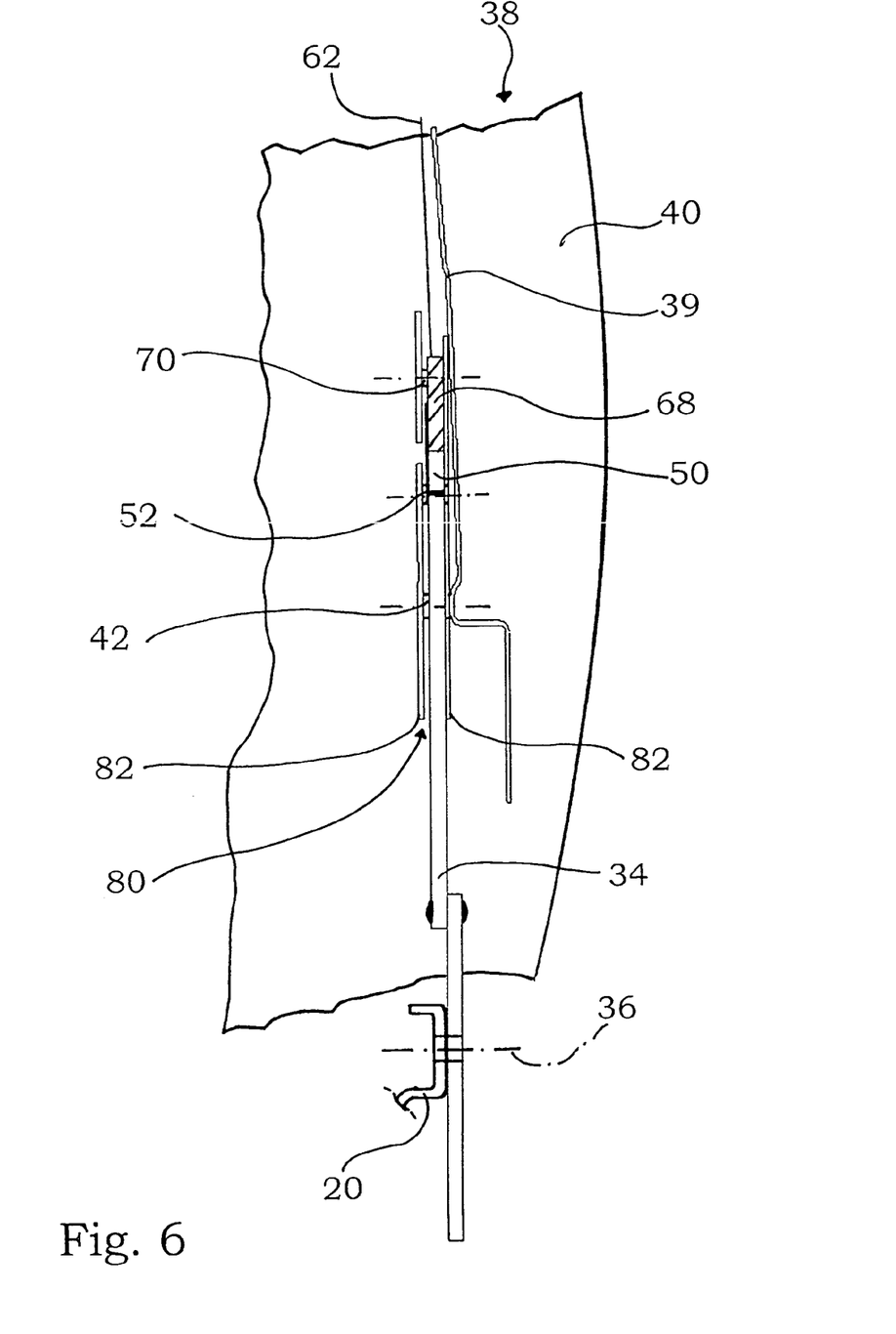
FIG. 6 is a sectional view taken along the line VI—VI in FIG. 2.

The upper hinge arm 34 carries a seat back 38. Referring to FIG. 6, the seat back has a carrier 39 and a padding body 40. The upper hinge arm 34 is connected to the seat back 38 through a forward tilt axis 42. Said forward tilt axis 42 is located in the region of the free end of the hook, in proximity to the inner curve of the hook. It is located substantially above the hinge axis 36 but is slightly offset toward the front relative thereto. As can be surveyed from the FIGS. 1–5, the forward tilt axis 42 is disposed at such a distance above the hinge axis 36 that the seat back 38 may be tilted forward into the horizontal plane without being hindered by the padding, as shown in the FIGS. 4 and 5.

The upper hinge arm 34 has an outer curve 44. In the region of the free end of the hook formed by the upper hinge arm 34, said outer curve is spaced a shorter distance from the forward tilt axis than in a region in which it is located in proximity to a back 46 of the seat back 38. A bight 48 is formed in said outer curve 44. A blocking lever 50, which is hinged about a blocking lever axis 52 to the seat back 38, is nested therein in the normal utilization position. In immediate proximity to its blocking lever axis 52 and substantially centered thereon, the blocking lever 50 has a blocking back 54 that abuts against a blocking curve 56 of the upper hinge arm 34 in the blocked position shown. The blocking lever 50 further has a front blocking side 58 which, in the normal position shown herein, clampingly rests against a complementary side 60 provided on the upper hinge arm 34. The front blocking side is oriented substantially parallel to the blocking back, at any rate parallel to a portion of the blocking back.

In proximity to the blocking side 58, a traction element 62, a cable for example, acts on the blocking lever 50. It is connected to a handle 64 which is disposed on the seat back 38, namely in the top region of said seat back 38, so as to be pivotable about a handle axis 66. The blocking lever is elastically biased in such a manner that it pivots in a counter-clockwise direction. This applies to the left seat side shown. The same applies in reverse to the right seat side.

Figure 1:
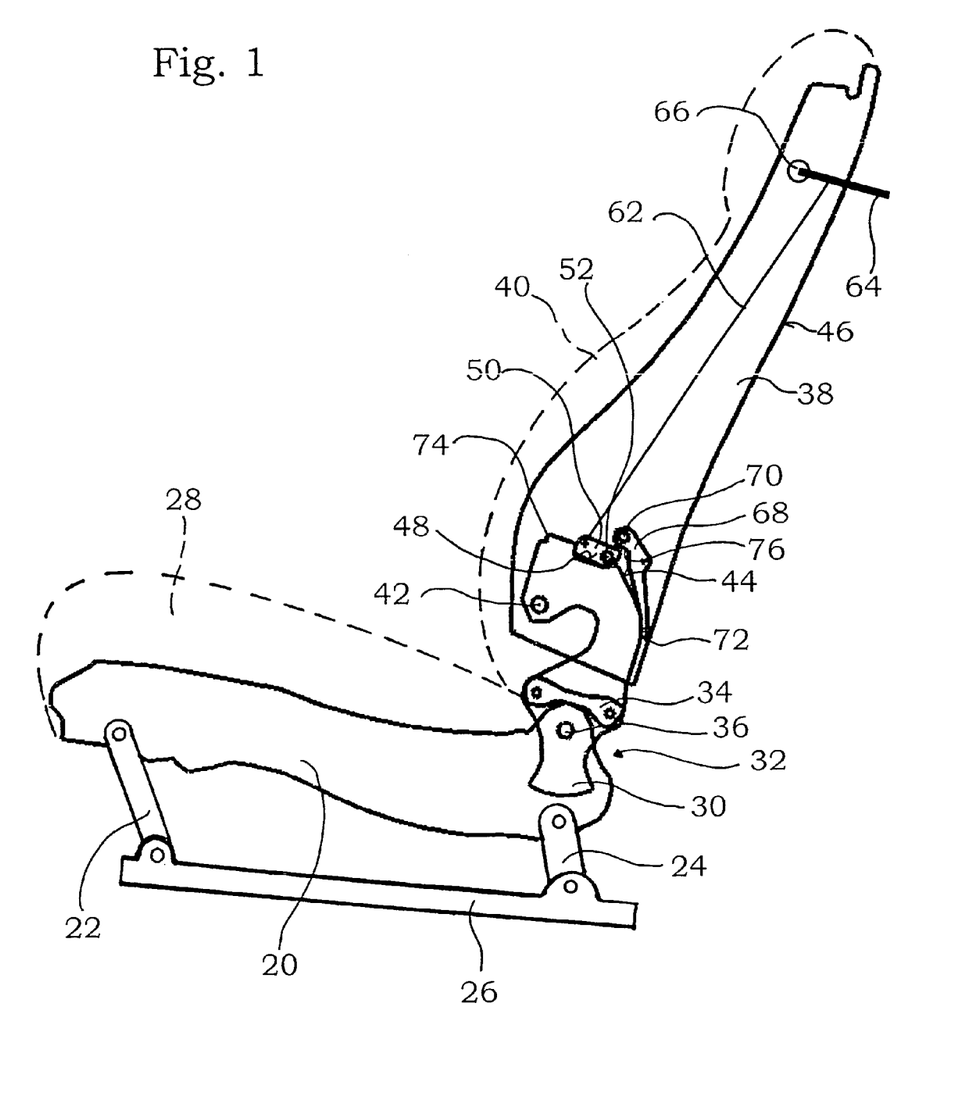
FIG. 1 is a side view of a vehicle seat in the normal utilization position with the blocking lever being in its blocked position and the handle being in the rest position.

FIG. 1 shows the handle 64 in its rest position. If it is pivoted in a counter-clockwise direction, as shown in the transition from FIG. 1 to FIG. 2, the blocking lever 50 is pivoted upward, the result being shown in FIG. 2. Now, the forward motion of the seat back 38 is no longer blocked.

In immediate proximity to, and slightly above, the blocking lever, a retaining lever 68 is disposed on the seat back 38 so as to be pivotable about a retaining lever axis 70. It is configured to be relatively elongated. The retaining lever axis 70 is located in an end region of said retaining lever 68 while a retaining lug 72 is located on its other relatively remote end portion. The retaining lever 68 is elastically biased in such a manner that it pivots in a direction counter to the direction of the blocking lever, in the exemplary embodiment in the clockwise direction. As a result, it abuts against the outer curve 44 as can be seen from FIG. 1.

Figure 2:
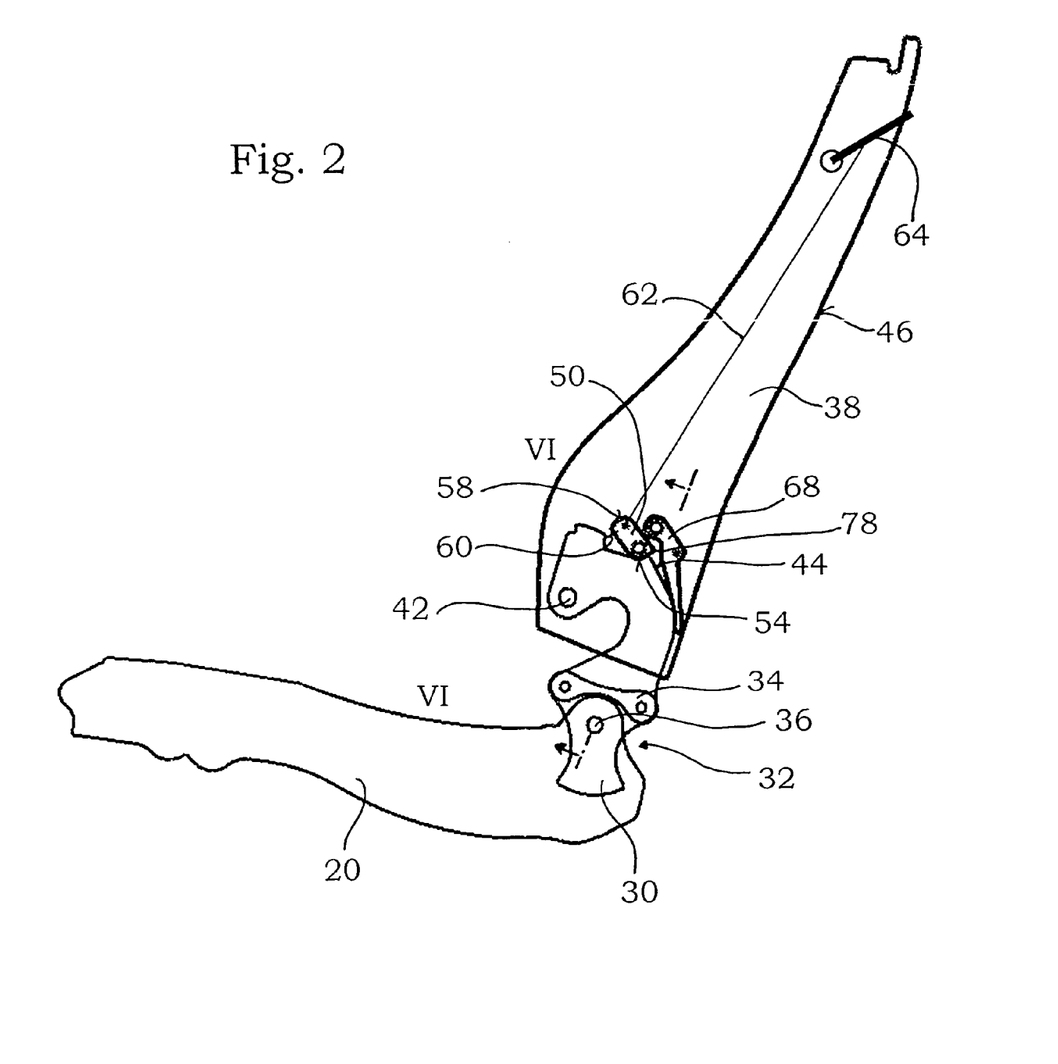
FIG. 2 is a side view of the motor vehicle seat which is, like in FIG. 1, in the normal utilization position, with the handle now being actuated though, and with the blocking lever being pivoted so that its blocking side is free of engagement by a complementary side.
Figure 3:
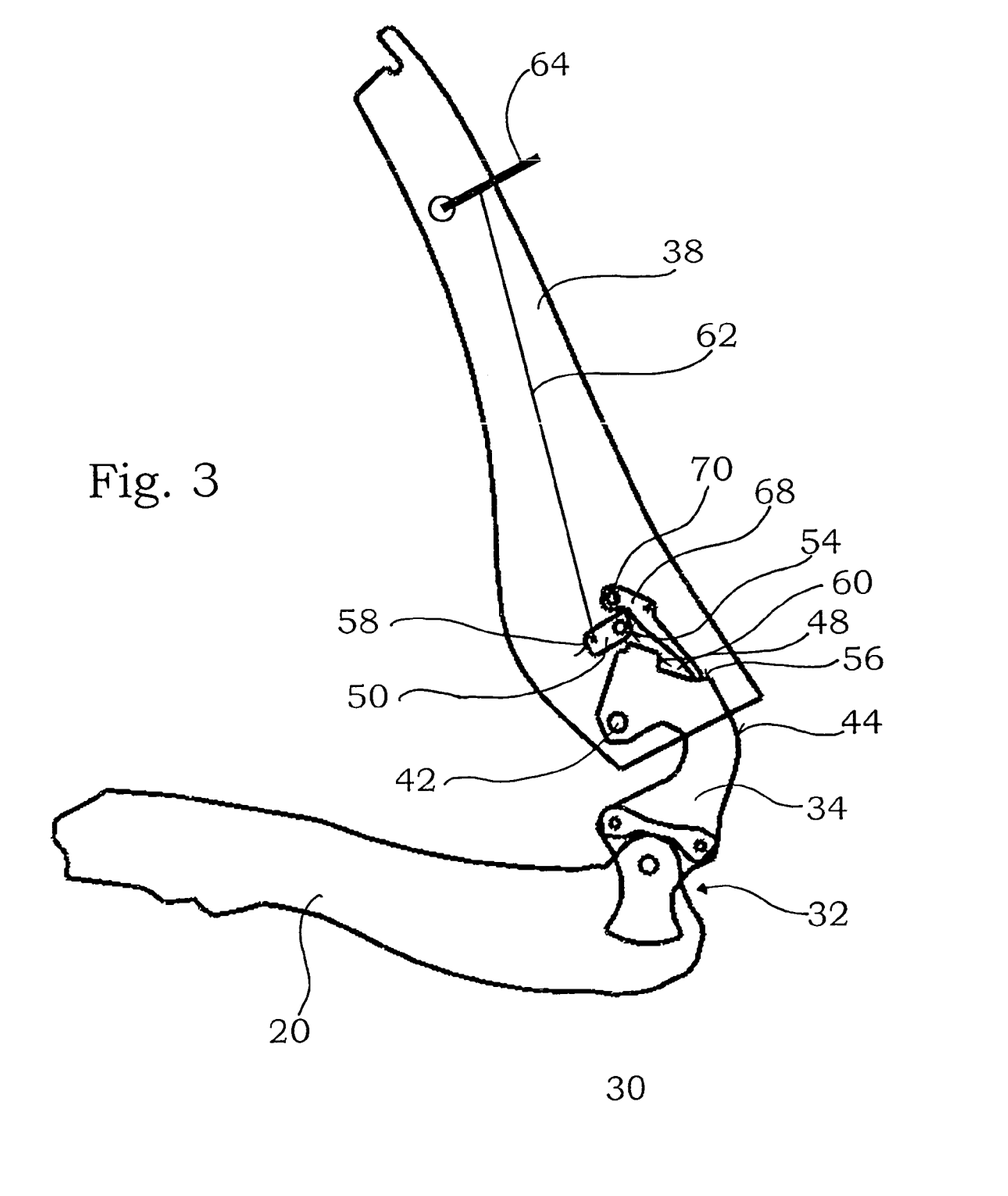
FIG. 3 is a side view of the motor vehicle seat similar to FIG. 2, with the seat back now being in a slightly forward tilted position.

In the position shown in FIG. 2, the retaining lever 68 still is in its normal position, like in FIG. 1. Upon tilting the seat back 38 forward, as can be inferred from the transition from FIG. 2 to FIG. 3, the retaining lever 68 rides along the outer curve 44 and also travels through its bight 48, said intermediate state being shown in FIG. 3. This intermediate state already allows the seat back 38 to be slightly supported by the retaining lug 72 which has now engaged in the bight 48. The seat back may be tilted further forward from this position any time as can be inferred from the transition from FIG. 3 to FIG. 4. Now the retaining lever 68 has travelled along the entire outer curve 44. At the end of the outer curve 44, the upper hinge arm 34 has a retaining catch stop 74 that is substantially shaped like a step. As the retaining lever 68 is spring-biased, it automatically engages said retaining catch stop 64, thus locking the seat back 38 the back 46 of which now is in a substantially horizontal plane, see FIG. 4. The seat back 38 is restricted from moving further downward by the padding of the seat carrier and of the seat back 38. A catch stop may also be provided between seat back 38 and upper hinge arm, though.

In order for the seat back 38, which is now in the table position, to be tilted back to its normal upright position, the retaining lever 68 must be pivoted to the released position. Again, the handle 64 is actuated for this purpose. It only acts onto the blocking lever 50. As said blocking lever is located in immediate proximity to the retaining lever 68, and as the retaining lever 68 comprises a driving side 76 which is in contact with an adjusting side 78 of the blocking lever 50, the retaining lever 68 is pivoted together with the blocking lever 50.

The cooperation between the driving side 76 of the retaining lever 68 and the adjusting side 78 of the blocking lever 50 is of paramount importance for the invention and will be described herein after:

In the position according to FIG. 1, a pivoting movement of the blocking lever 50 will have no effect on the retaining lever 68. The retaining lever 68 is resting against the outer curve 44 and is given an orientation as a result thereof. Only after the retaining lever 68 has been pivoted, from the orientation it had FIG. 1, a sufficient angle in the clockwise direction, will its driving side cooperate with the adjusting side 78, meaning will its driving side 76 come into the range of movement of the adjusting side 78. The retaining lever 68 will be pivoted sufficiently when the seat has reached the position shown FIG. 4, meaning when it is tilted forward. As a result, the outer curve acts as a control curve for the retaining lever 68. When the retaining lever 68 is resting against the outer curve 44, its driving side 76 is outside the range of movement of the adjusting side 78 of the blocking lever 50. This applies in any event to a seat back position in the normal utilization position. If the seat back is tilted forward, and if the retaining lever 68 rides along the outer curve 44, it is slightly pivoted in the clockwise direction because—as described herein above—the distance between the outer curve 44 and the forward tilt axis 42 becomes increasingly shorter. When the retaining lever 68 performs its retaining function, meaning when it is in the position shown FIG. 4, the retaining lever is pivoted so far relative to the seat back that it may now in any event be taken along by the blocking lever.

An intermediate position may be provided for in which the retaining lug 72 engages deep enough into the bight 48. This may also cause the retaining lever 68 to be pivoted sufficiently so that the retaining lever 68 is now within the range of movement of the blocking lever 50, so that it can be released by a pivoting movement.

A small pivoting movement will suffice to pivot the retaining lever 68 to the released position, meaning to press the retaining lug 72 so as to release it from engagement with the retaining catch stop 74. The corresponding position is shown in FIG. 5. The handle is actuated, it is in the same position as in FIG. 2. From this position, the folded seat can be tilted back to its upright position, the seat back 38 can be pivoted to its normal position. The retaining lug 72 thereby rides again along the outer curve 44, it also travels through the bight 48. A certain resistance is thus created which it is possible to overcome since there is no self-locking. The seat back 38 is returned to the position according to FIG. 1. The upward tilting motion of the seat back 38 can be assisted by a spring.

FIG. 6 shows the upper hinge arm 34, which is composed of two component parts. In the top region, the upper hinge arm 34 is housed in a passage 80.

Said passage is formed by the carrier 39 and by metal sheets 82. FIG. 6 also shows the padding 28 of the seat back 38.

The invention claimed is:

1. A motor vehicle seat comprising:
   a seat carrier;
   seat back;
   a seat back hinge disposed between said seat carrier and said seat back and which is comprised of a lower hinge arm associated with said seat carrier and an upper hinge arm associated with said seat back, wherein a forward tilt axis connects the upper hinge arm to the seat back;
   a locking mechanism arranged between the seat back and the upper hinge arm, said locking mechanism preventing the forward tilting motion of the seat back about the forward tilt axis in the locked position and allowing said seat back to tilt forward in the released position, the locking mechanism comprising a handle;
   a blocking lever hinged to the seat back, wherein said blocking lever is connected to and cooperates with the handle and is comprised of a blocking side, wherein the upper hinge arm has a complementary side that cooperates with the blocking side and further forms a retaining catch stop; and
   a retaining lever hinged to the seat back, said retaining lever forming a retaining lug abutting against the retaining catch stop in the forward tilted position of the seat back and retaining the seat back in the forward tilted position, wherein the blocking lever is located in proximity to the retaining lever and is pivoted upon actuation of the handle and abuts against the retaining lever which is pivoted as a result thereof, whereby the retaining lug is released from engagement with the retaining catch stop,
   wherein the blocking lever comprises a blocking back,
   wherein a blocking curve is formed on the upper hinge arm, and
   wherein the blocking back rests against the blocking curve in the normal utilization position of the seat back.

2. The motor vehicle seat according to claim 1, wherein the upper hinge arm has an outer curve and wherein the retaining lever slidably rests on said outer curve.

3. The motor vehicle seat according to claim 1, wherein the retaining lever is elongated, a retaining lever axis is located at one end region thereof and the retaining lug is located at the other end region thereof.

4. A motor vehicle seat comprising:
   a seat carrier;
   a seat back;
   a seat back hinge disposed between said seat carrier and said seat back and which is comprised of a lower hinge arm associated with said seat carrier and an upper hinge arm associated with said seat back, wherein a forward tilt axis connects the upper hinge arm to the seat back;

a locking mechanism arranged between the seat back and the upper hinge arm, said locking mechanism preventing the forward tilting motion of the seat back about the forward tilt axis in the locked position and allowing said seat back to tilt forward in the released position, the locking mechanism comprising a handle;

a blocking lever hinged to the seat back, wherein said blocking lever is connected to and cooperates with the handle and is comprised of a blocking side, wherein the upper hinge arm has a complementary side that cooperates with the blocking side and further forms a retaining catch stop; and a retaining lever hinged to the seat back, said retaining lever forming a retaining lug abutting against the retaining catch stop in the forward tilted position of the seat back and retaining the seat back in the forward tilted position, wherein the blocking lever is located in proximity to the retaining lever and is pivoted upon actuation of the handle and abuts against the retaining lever which is pivoted as a result thereof, whereby the retaining lug is released from engagement with the retaining catch stop.

wherein the blocking lever comprises an adjusting side, and wherein the retaining lever has a driving side which lies within the range of movement of the adjusting side if the retaining lever is sufficiently pivoted out of the position of the retaining lever in the normal utilization position of the seat back.

5. The motor vehicle seat according to claim 4, wherein the upper hinge arm has an outer curve and wherein the retaining lever slidably rests on said outer curve.

6. The motor vehicle seat according to claim 4, wherein the retaining lever is elongated, a retaining lever axis is located at one end region thereof and the retaining lug is located at the other end region thereof.

7. A motor vehicle seat comprising:
a seat carrier;
a seat back;
a seat back hinge disposed between said seat carrier and said seat back and which is comprised of a lower hinge arm associated with said seat carrier and an upper hinge arm associated with said seat back, wherein a forward tilt axis connects the upper hinge arm to the seat back;

a locking mechanism arranged between the seat back and the upper hinge arm, said locking mechanism preventing the forward tilting motion of the seat back about the forward tilt axis in the locked position and allowing said seat back to tilt forward in the released position, the locking mechanism comprising a handle;

a blocking lever hinged to the seat back, wherein said blocking lever is connected to and cooperates with the handle and is comprised of a blocking side, wherein the upper hinge arm has a complementary side that cooperates with the blocking side and further forms a retaining catch stop; and a retaining lever hinged to the seat back, said retaining lever forming a retaining lug abutting against the retaining catch stop in the forward tilted position of the seat back and retaining the seat back in the forward tilted position, wherein the blocking lever is located in proximity to the retaining lever and is pivoted upon actuation of the handle and abuts against the retaining lever which is pivoted as a result thereof, whereby the retaining lug is released from engagement with the retaining catch stop.

wherein the blocking lever is hinged to the seat back and is pivotable about a blocking lever axis, and wherein the retaining lever is hinged to the seat back and is pivotable about a retaining lever axis, the blocking lever axis and the retaining lever axis being aligned with each other on a line that is substantially parallel to a back of the seat back.

8. The motor vehicle seat according to claim 7, wherein the upper hinge arm has an outer curve and wherein the retaining lever slidably rests on said outer curve.

9. The motor vehicle seat according to claim 7, wherein the retaining lever is elongated, a retaining lever axis is located at one end region thereof and the retaining lug is located at the other end region thereof.

* * * * *